(No Model.) 3 Sheets—Sheet 1.
E. D. & O. B. REYNOLDS.
HAY TEDDER.
No. 449,948. Patented Apr. 7, 1891.
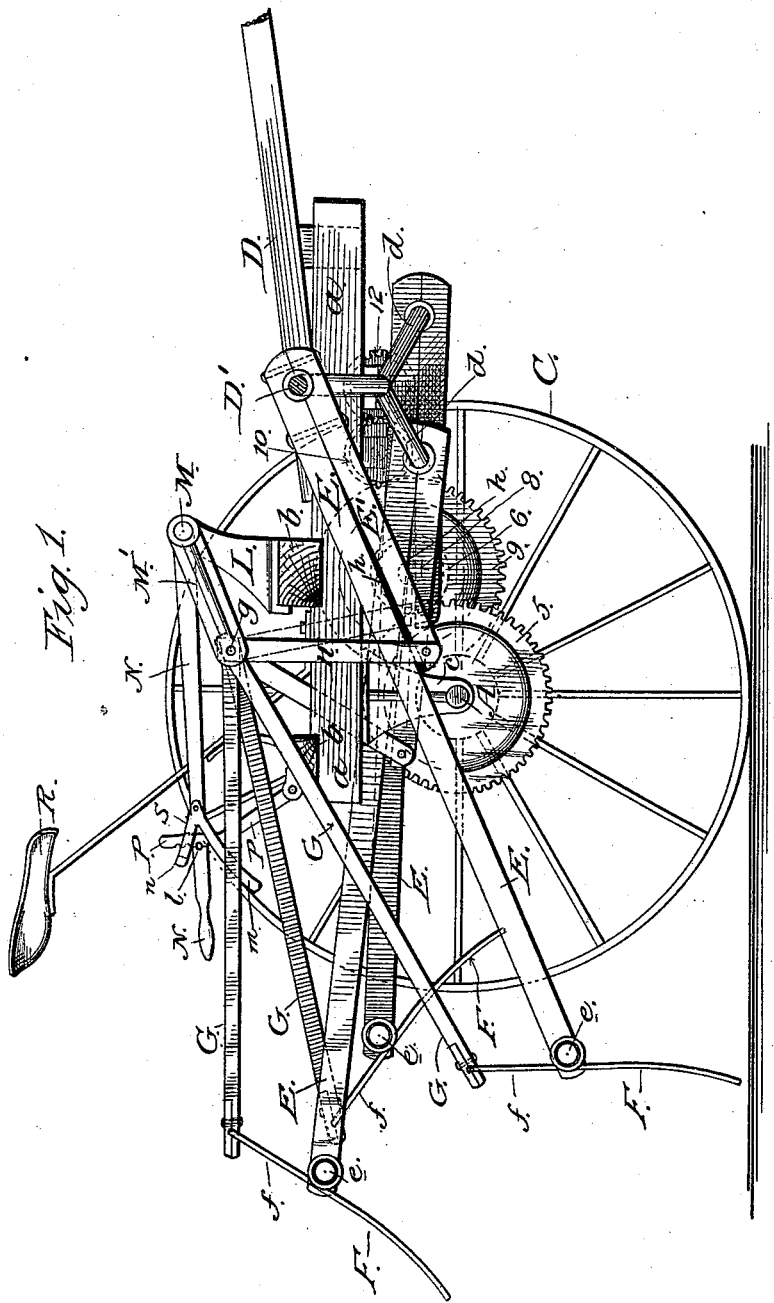
Witnesses
Chapman Fowler
N. T. Miller
Inventors
Edmund D. Reynolds,
Oliver B. Reynolds,
By Their Attorneys
A. H. Evans & Co.

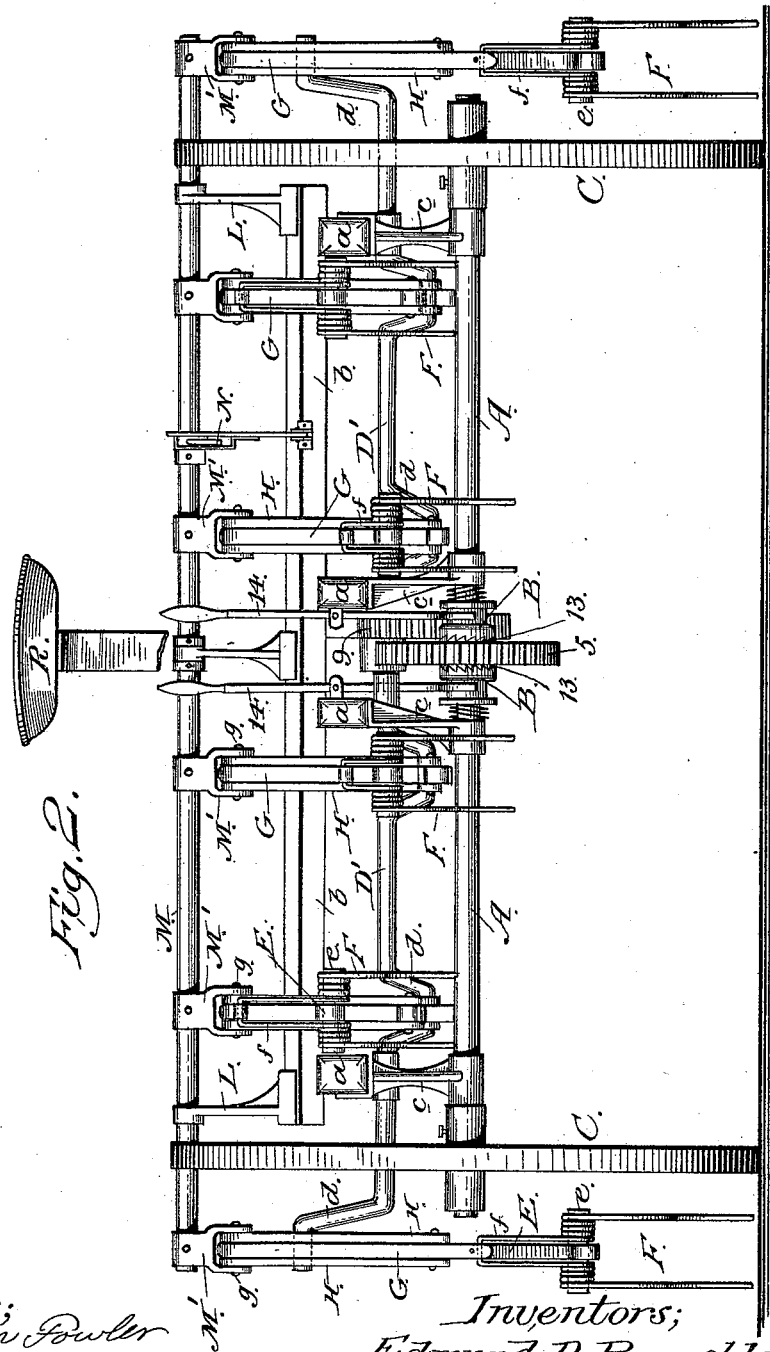

(No Model.) 3 Sheets—Sheet 3.
E. D. & O. B. REYNOLDS.
HAY TEDDER.
No. 449,948. Patented Apr. 7, 1891.
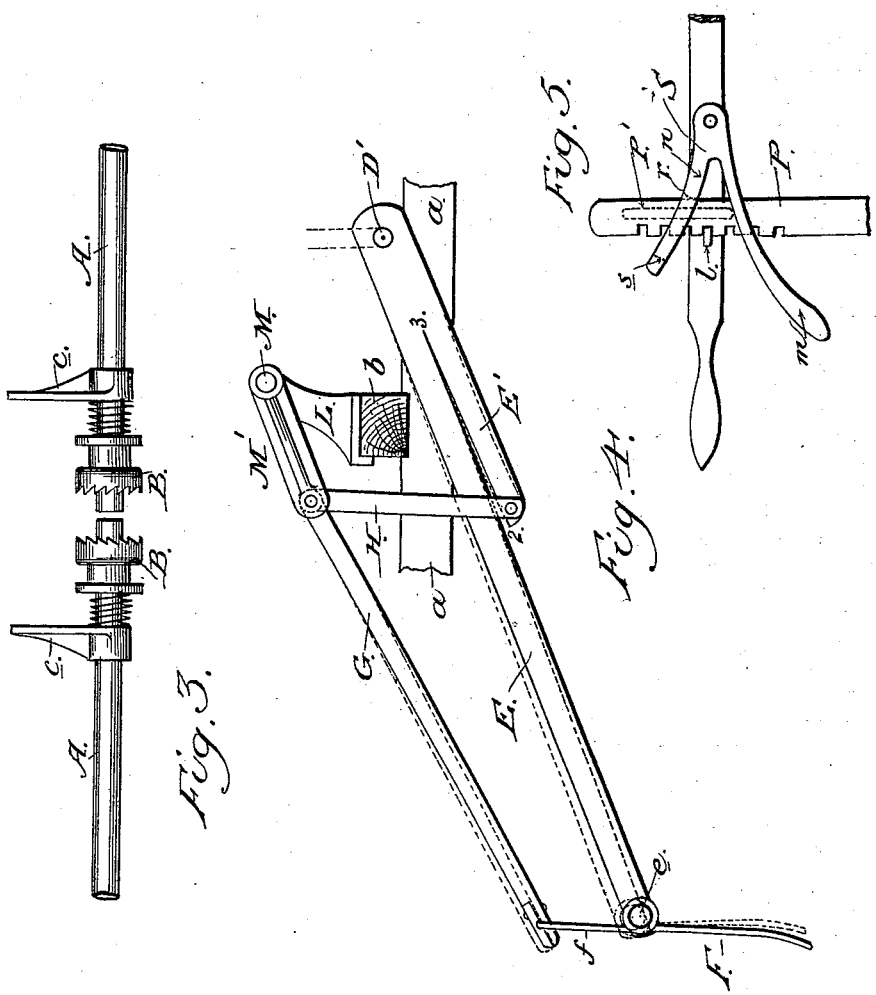
Witnesses
Chapman Fowler
N. P. Miller
Inventor
Edmund D. Reynolds,
Oliver B. Reynolds.
by A. H. Evans & Co
Attorneys

UNITED STATES PATENT OFFICE.

EDMUND D. REYNOLDS AND OLIVER B. REYNOLDS, OF BROCKTON, MASSACHUSETTS.

HAY-TEDDER.

SPECIFICATION forming part of Letters Patent No. 449,948, dated April 7, 1891.

Application filed August 13, 1890. Serial No. 361,877. (No model.)

*To all whom it may concern:*

Be it known that we, EDMUND D. REYNOLDS and OLIVER B. REYNOLDS, citizens of the United States, residing at Brockton, in the county of Plymouth and State of Massachusetts, have invented certain new and useful Improvements in Hay-Tedders, of which the following is a full and clear description, reference being had to the accompanying drawings, forming part of this specification, in which—

Figure 1 represents a side elevation of a hay-tedder embodying our invention, showing one of the main supporting-wheels removed and the forks in their different positions. Fig. 2 is a rear view of Fig. 1. Fig. 3 is a detail of the two-part shaft or axle, showing the clutch rings or sleeves on the inner end thereof. Fig. 4 is a detail of one of the tedder-arms. Fig. 5 is a detail to be referred to.

Our invention has relation to that class of agricultural machines known as "hay-tedders" and to the specified class employing forks which are operated by means of a crank-shaft; and our invention consists of the constructions, combinations, and arrangements of parts which we shall herein fully describe and claim.

To enable others skilled in the art to which our invention appertains to make and use the same, we will now describe its construction and indicate the manner in which the same is carried out.

In the said drawings, A represents a main shaft or axle divided into two parts and having their adjoining ends provided with clutch rings or sleeves B, for a purpose we will hereinafter describe, and C indicates the main supporting or bearing wheels on the outer ends of said shafts.

The main frame of the machine consists, essentially, of suitable longitudinal and cross beams *a* and *b*, respectively, to the former of which any well-known form of thill or pole D may be secured, while suitable hangers *c* depend from the beams *a* to the main shaft or axle to support and brace the latter. A crank-shaft D' is mounted in boxes, and has its cranks *d* set at different inclinations to give the desired movements to the forks, the two end cranks being outside of the line of the main supporting or bearing wheels C, as shown in Fig. 2.

Upon the crank portions of the shaft D' the forward ends of the tedder-arms E are journaled, the rear ends of said arms having short shafts or pins *e* mounted in them and adapted to serve as bearings for the forks F, which may be of any well-known form, but herein shown as consisting of a single piece of heavy spring-wire coiled upon the pins *e* upon each side of the arms, and thence extended upwardly to form short arms *f*, which are loosely passed through the rear ends of bars G, whose forward ends are pivotally held by pins *g* to the upper ends of links H, which in turn have their lower ends pivotally secured to the tedder-arms E at points between the front and rear ends thereof.

The tedder-arms E are of peculiar construction and are made "springy" or yielding to relieve the forks of strain when meeting heavy objects or other obstructions. These arms E may be each made of one piece widened at its front, where it is hung upon the crank-shaft, and having a kerf made longitudinally in it, as shown at 2 3 in Fig. 4, or they may be formed of two pieces bolted together, as shown in Fig. 1, the latter being the preferred construction. When constructed as in Fig. 1, these arms will have the parallel short arms E' bolted to the main arms E at their forward ends and back of the crank-shaft connection, and the rear ends of the short arms E' will be preferably tapered or beveled to form a narrow space *h*, as shown. From this description it will be seen that when the fork meets an obstruction too heavy for it to safely lift it the resistance of said obstruction is transmitted to the rear end of the tedder-arm. The continued strain upon the fork causes the long arm of the tedder-arm to yield, and as the short parallel member E' is firmly secured to the long member by its bolt back of the crank-shaft the yield or spring of the long arm is immediately communicated to the short member. Now as the short member is held at its rear end by the link H, it is manifest that as the long member begins the lift the short member is also slightly "bowed,"

thereby making the tedder-arm flexible throughout its length. (See dotted lines in Fig. 4.) As the forks rise with their weight of hay, the strain is again brought upon the tedder-arm to cause the meeting sides of the long and short members of the arm to close on each other, the tapering space between them providing for this movement and the arm being to all practical purposes a single rigid arm.

One of the cross-beams $b$ of the main frame has secured to it upwardly-extending brackets L, in the upper ends of which is mounted a rod or shaft M, having bifurcated arms M' fixed thereto, with their outer ends hung upon the pin which unites the upper ends of the links H and bars G, thereby suspending said bars and link directly from these arms. The shaft M also has secured rigidly to it a hand-lever N, which when operated adjusts the positions of the forks with relation to the ground. To hold the forks securely to their work and to prevent unnecessary or undue rattling and wear of the pivots of the tedder-arms and adjunctive parts, we employ a notched dog P and pivot the same upon one of the cross-beams $b$, so that its notched face may be thrown into engagement with a pin or stud $l$ upon the side of the hand-lever, the said dog having a guide P' for the operating hand-lever N. (See Fig. 5.) To the hand-lever N we also pivotally secure a pawl S, having a weighted handle portion $m$ and a short arm $n$, provided with a cam-surface $r$ and lug $s$. From this arrangement of devices it will be seen that when the forks have been adjusted to the proper distance above the ground the pawl S, by reason of its weighted handle portion, will cause its cam-surface $r$ to bring the dog closely into contact with the pin or stud $l$ and hold the parts against movement. When it is desired to change the position of the forks, the handle portion of the pawl is raised, which movement brings the lugs against the dog P and forces the same out of its engagement with the pin $l'$ on the lever. The new adjustment being obtained, the pawl is let go, when the weight of its handle portion causes the cam to again lock the parts in the manner previously stated.

The machine is provided with a support for the operator's seat R, and the power and motion of the main bearing-wheels and axle are transmitted to the crank-shaft through the medium of a gear-wheel 5 on the main axle engaging a pinion 6 on a stub-shaft 8, that also carries a gear-wheel 9, adapted to mesh with an idle-pinion 10, which meshes with and operates a similar pinion 12 on the crank-shaft. The gear-wheel 5 has clutch-surfaces 13 on its opposite sides, into engagement with which the clutch rings or sleeves splined on the inner ends of the two-part main shaft or axle are adapted to be brought when said rings or sleeves are moved by the springs surrounding the shafts between the clutch-collars and the supporting-brackets $c$. The hand-levers 14 are pivoted to the frame and engage grooves in the clutch-collars by their lower forked ends. This construction enables us to disconnect the power from both sections of the main axle to stop the operation of the machine, while these yielding clutches also permit the machine to turn around without disconnecting the power devices, one of the ratchets in this latter instance slipping and the other continuing the power without straining the machine.

Having thus described our invention, what we claim as new, and desire to secure by Letters Patent, is—

1. A hay-tedder having approximately-horizontal arms adapted to yield throughout their length in vertical planes when a predetermined strain is brought against the fork.

2. In a hay-tedder, the tedder-arms having long and short members parallel with each other, with a narrow space separating a portion of the one from the other, links connected with the short members of the arms and having a fixed connection at their upper ends, and forks carried by the longer member thereof, substantially as herein described.

3. In a hay-tedder, the fork-carrying arms thereof divided for a portion of their length to form long and short members, links connected directly to the short members, having a fixed connection at the other end, pivoted forks carried by the long members of said arms, and connections from the forks to the links, substantially as herein described.

4. In a hay-tedder, the combination, with the main bearing-wheels, the tedder-arms and adjunctive parts, and the operating crank-shaft, of the main axle formed of two sections, clutch rings or sleeves upon the adjoining ends of said sections, a gear-wheel between said sleeves having clutch-surfaces engaged thereby, and levers for moving said sleeves into and out of connection with said gear-wheel, substantially as herein described.

5. In a hay-tedder, the combination, with the main wheels, the main shaft or axle, the crank-shaft, and gearing between the same and the main shaft or axle, of the yielding tedder-arms comprising the long and short arms E and E', connected with the crank-shaft, the forks at the rear of the long arms E, the bars connected with the upper ends of the forks, the links connecting the forward ends of said bars with the short members of the tedder-arms, and the operating hand-lever and arm for suspending and adjusting the tedder-arms, substantially as herein described.

6. In a hay-tedder, the main frame, axle, and bearing-wheels, the crank-shaft geared to the main axle, the tedder-arms operated by the crank-axle, the forks at the rear of the arms and having upward extensions, the bars G, in which said extensions are mounted, the connecting-link at the front ends of the bars and connecting with the tedder-arms at points near the center thereof, the rod or shaft having the arms connected with the links, and a hand-lever on said rod or shaft for adjusting the same, substantially as herein described.

7. In a hay-tedder, the main frame, the tedder-arms and adjunctive parts, and the adjusting hand-lever, in combination with a pivotally-secured notched dog adapted to engage a pin or stud on the lever, and a weighted pawl pivoted to the lever, having an arm provided with a cam-surface and lug, substantially as herein described.

8. In a hay-tedder, the main frame, the crank-shaft, and the oscillating tedder-arms, with their bars G and links H, in combination with means for suspending and adjusting said arms, comprising a shaft having arms connected with the links and a hand-lever for moving the arms and elevating and depressing the tedder-arms, substantially as herein described,

EDMUND D. REYNOLDS.
OLIVER B. REYNOLDS.

Witnesses:
FRANCIS B. PORTER,
HERBERT H. CHASE.